United States Patent [19]
Larson

[11] 3,820,097

[45] June 25, 1974

[54] FLAME DETECTION SYSTEM WITH COMPENSATION FOR THE FLAME DETECTOR

[75] Inventor: Martin E. Larson, Minneapolis, Minn.

[73] Assignee: Honeywell Inc., Minneapolis, Minn.

[22] Filed: Apr. 16, 1973

[21] Appl. No.: 351,740

[52] U.S. Cl. .............................. 340/228.2, 307/117

[51] Int. Cl. .............................. G08b 17/12

[58] Field of Search ..... 340/228.2, 248 A; 250/554, 250/206, 206 X, 210, 210 X; 307/117; 330/106

[56] References Cited

UNITED STATES PATENTS

| | | | |
|---|---|---|---|
| 2,834,008 | 5/1958 | Carbauh | 340/228.2 |
| 3,154,724 | 10/1964 | Giuffrida | 340/228.2 |
| 3,471,700 | 10/1969 | Presti | 250/206 |
| 3,743,837 | 7/1973 | Pooley et al. | 250/206 |

*Primary Examiner*—John W. Caldwell
*Assistant Examiner*—Glen R. Swann, III
*Attorney, Agent, or Firm*—Lamont B. Koontz; Alfred N. Feldman

[57] ABSTRACT

A flame detection system utilizes a flame responsive impedance, such as a lead sulphide photocell, and responds to the change in infrared radiation and the flame flicker frequency of the sensed flame. The flame responsive impedance is connected through a variable impedance means to a source of direct current voltage. The voltage between the flame responsive impedance and the variable impedance means is compared by an amplifier to a voltage divider network so that a feedback voltage can be generated by the amplifier to control the variable impedance means. The variable impedance means is controlled by the feedback so as to keep the direct current voltage across the flame responsive impedance constant to compensate for variations in flame background radiation, and cell to cell variation. The system then uses a band-pass amplifier and detector-integrator system to control an output switch.

15 Claims, 3 Drawing Figures

FLAME DETECTION SYSTEM WITH COMPENSATION FOR THE FLAME DETECTOR

BACKGROUND OF THE INVENTION

In infrared flame detection systems a normal sensing element is a lead sulphide photocell. This photocell varies from unit to unit in its resistance, and also has a varying background radiation sensed during an operating mode. The sensing device and system not only responds to the infrared radiation generated at the flame, but responds to the frequency of the flame flicker. This flame flicker frequency is normally in the 6 to 15 hertz range. In order to protect the system against line voltage transients and 60 hertz frequencies, the system normally is tuned by the use of band-pass filter or band-pass amplifier in a range up to approximately 15 to 18 hertz. The flame flicker signal is then normally amplified and used to control an output switch.

SUMMARY OF THE INVENTION

The present invention is directed to a variable impedance means which is connected in series with the lead sulphide photocell and which is controlled by the feedback of a first amplifier stage to stabilize the voltage across the lead sulphide cell to compensate for any variations from one cell to the next, and to adjust the system to compensate for background radiation levels. After the signal has been amplified by the first amplifier stage and its feedback control system, the flame flicker signal is passed through a very narrow band-pass amplifier which rejects any frequency that would be in the class of noise or 60 hertz frequency that might be present in a conventional system. The flame flicker signal from the band-pass amplifier is then fed through a detector and integrator circuit so that the existance of a flame flicker signal for a short period of time is required in order to trip or activate the final output switch. The output switch can be of a solid state type, or of a solid state type which in turn drives a conventional relay.

DESCRIPTION OF THE PREFERRED EMBODIMENTS

Figure 1:
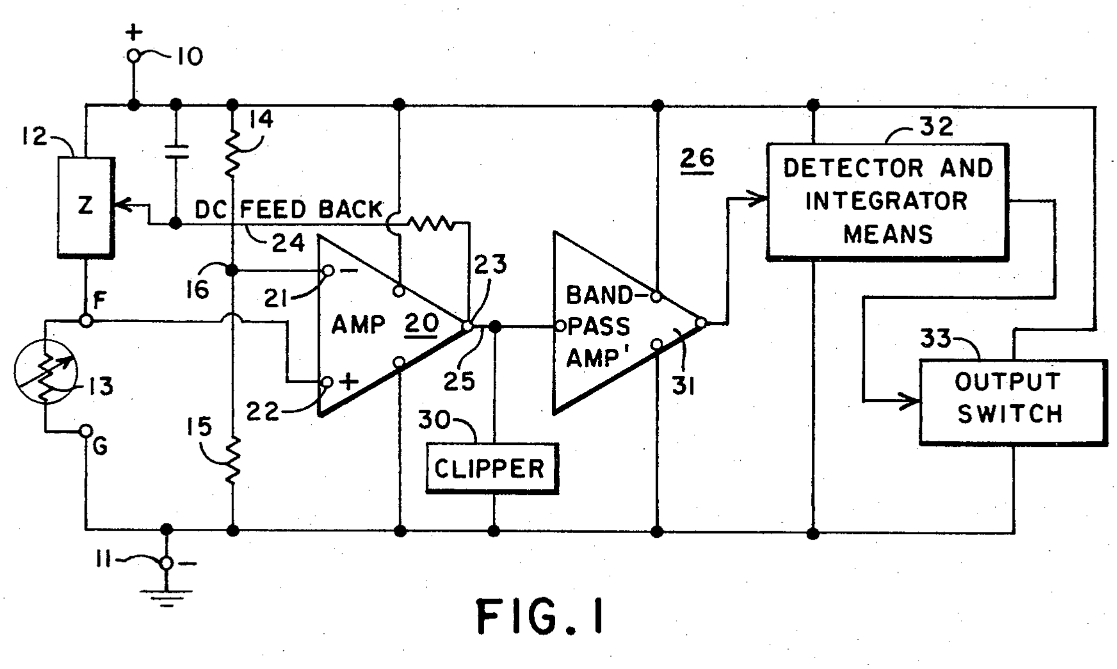
FIG. 1 of the present application is a block diagram of a complete system utilizing the present invention.

FIG. 1 is a block diagram, in a highly simplified form, of the flame detection system of the present invention. The flame detection system includes a direct current source connected between terminals 10 and 11, with terminal 11 being a common ground for the system. Connected between terminals 10 and 11 is a variable impedance means 12 in series with a flame responsive means 13 that is external to the flame detection system, and is connected between terminals F and G. A voltage divider or voltage reference means made up of resistors 14 and 15 is connected across the terminals 10 and 11 and has a common point 16. The variable impedance means 12, the flame responsive means 13, the resistance 14, and the resistance 15 make up a bridge with output terminals between the terminals F and the point 16.

An amplifier means 20 with input means in the form of terminals 21 and 22 are connected to the points F and 16 to sense the output of the previously mentioned bridge. The amplifier means 20 has an output terminal 23 and further includes a direct current feedback means 24 that is connected to the impedance means 12. The output 23 of the amplifier means 20 is connected by conductor 25 to a switch means 26, generally made up of a clipper 30, a band-pass amplifier 31, a detector and integrator means 32, and a final output switch 33.

OPERATION OF FIG. 1

In a typical application for a system of the type disclosed in FIG. 1, the flame responsive means 13 would be a lead sulphide photocell exposed to a burner of a furnace or similar heat generating means. The present flame detection system is designed to operate on the flame flicker generated at the burner. A flame flicker system operates in the infrared radiation range and responds to the varying flicker of a burning flame. This flicker normally has a varying frequency range, but the most important part of the range is in approximately the 6 to 15 hertz frequency band. The flame responsive means 13 also is exposed to an ambient background radiation of infrared that usually is a relatively constant value, but varies slowly with changes in the background radiation of the furnace as the furnace changes temperature. Also, flame responsive means of the lead sulphide cell type have quite a substantial variance from cell to cell. As a result of the variance in background radiation, and the variance in the cell to cell impedance, the application of this type of system has been difficult as the input to the amplifier for the system has varied over quite a wide range. The present system compensates for that variation by providing the variable impedance means 12 in series with the flame responsive means 13 across the direct current source between terminals 10 and 11. The bridge output between terminals F and 16 supplies the amplifier 20 with a slowly changing value that is a function of the background, as well as a flame flicker output which is in the 6 to 15 hertz range. The amplifier 20 has an output on conductor 25 which is an alternating current of approximately 6 to 15 hertz, as well as, a direct current feedback on conductor 24 which adjusts the variable impedance means 12. With the present arrangement the adjustment of the variable impedance means 12 keeps the voltage at terminal F substantially constant, as far as the direct current potential is concerned.

The flame flicker frequency on conductor 25 is clipped by the clipper 30 to keep the amplitude of the signal relatively low thereby aiding the band-pass amplifier 31 in rejecting signals other than the frequency desired. As the desired frequency passes through the band-pass amplifier 31, it is fed to a detector and integrator circuit which integrates a number of flame flicker cycles. When a number of the cycles have been present and detected, a sufficient signal is generated by the detector means 32 to operate an output switch 33 thereby indicating that a proper flame exists.

Figure 2:
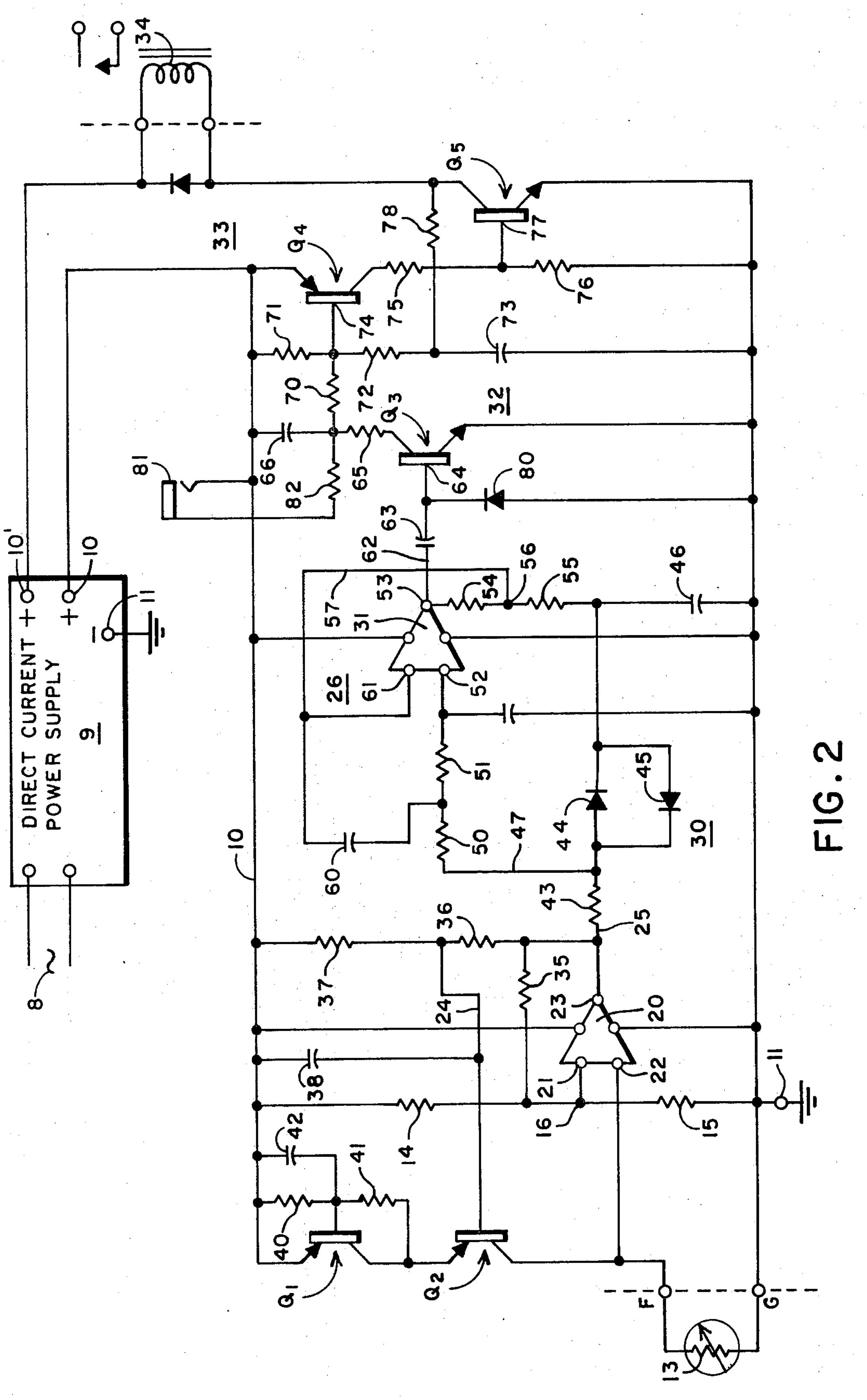
FIG. 2 is a schematic representation of a complete infrared flame flicker responsive type control system.

In FIG. 2 a detailed circuit configuration for the block diagram of FIG. 1 is disclosed. Similar numbers will be used for corresponding parts.

A direct current power supply 9 is disclosed being grounded at 11 and having an alternating current input 8. The direct current supply can be of any conventional design and is not material to the present invention. The direct current supply 9 has an output terminal 10 which supplies a very well regulated direct current potential. A terminal 10' is also shown and provides a direct current potential for operation of an output relay 34 which forms part of the output switch means generally shown at 33. The output relay 34 can be operated from a less well regulated supply from the terminal 10' or could be supplied from terminal 10, if desired.

The direct current potential between 10 and the ground 11 is again disclosed along with the terminals F and G to which the flame responsive means or lead sulphide cell 13 is connected. This cell has a very high resistance when exposed to a dark ambient, while it has a quite low value of resistance when exposed to a high infrared source. The flame responsive means 13 is connected in series with impedance 12, which in this case is made up of a pair of transistors Q1 and Q2 which are connected in a series configuration wherein the emitter-collectors of each of the transistors Q1 and Q2 are connected in series to form part of the variable impedance means 12.

The resistors 14 and 15 with their common junction 16 are again disclosed along with the amplifier 20. The input to the amplifier 20 at terminals 21 and 22 are connected across the terminals F and 16 as was disclosed in FIG. 1. The amplifier means 20 has an output terminal 23 which is connected to a series of resistors 35, 36, and 37. The resistor 35 is a feedback resistor for the amplifier and affects the gain of the amplifier, as is well known. The resistors 36 and 37 provide a voltage divider network for part of the feedback means 24 which is connected to the base of the transistor Q2 to control Q2 by way of its base as part of the variable impedance means 12. In order to insure that the feedback on conductor 24 is a direct current feedback, a capacitor 38 is provided between the conductor 24 and the power terminal 10.

The transistor Q1 is provided with a pair of resistors 40 and 41 across the emitter-base and the base-collector of the transistor to bias the transistor. A capacitor 42 is provided for bypassing alternating current so that the feedback circuits involved are substantially a direct current type of feedback arrangement.

The output of amplifier 20 on conductor 25, in the present circuit, will be basically made up of the flame flicker frequency and any alternating current noise that may have gotten through the amplifier means 20. The conductor 25 is connected to a resistor 43 to a pair of back-to-back diodes 44 and 45 that are in turn connected through a capacitor 46 to ground. The back-to-back diodes and the capacitor 46 make up a clipper circuit which limits the input on the conductor 47 which is used as an input for the band-pass amplifier shown at 31.

The conductor 47 is connected through a pair of resistors 50 and 51 to the noninverting terminal 52 of the band-pass amplifier 31. The output 53 of the band-pass amplifier 31 is connected through a pair of resistors 54 and 55 to the capacitor 46. A junction 56 between the resistors 54 and 55 and a conductor 57 provides a feedback for the amplifier 31 to the inverting terminal 61 and to the junction of the resistors 50 and 51 through a capacitor 60. The feedback capacitor 60, the resistors 50 and 51, and the amplifier 31 form a conventional band-pass type of amplifier. The feedback provides an active T-type of filter along with the amplifier 31 so that the amplifier 31 acts as a narrow band-pass type of amplifying device. The input of the amplifier 31 has been slipped by the back-to-back diodes 44 and 45 so that the input signal is kept quite low. This acts as a rejection of unwanted noise and frequencies such as 60 hertz that might be present in this type of equipment.

The output of the terminal 53 on conductor 62 to a capacitor 63 is an alternating current at a flame flicker frequency. The capacitor 63 is used as a coupling capacitor to the detector and integrator means generally shown at 32. The detector and integrator means 32 is made up of a transistor Q3 which has its base 64 connected to the capacitor 63 and which conducts through a resistor 65 and a capacitor 66. Each time an alternating current cycle passes through the capacitor 63, the transistor Q3 conducts for a short period of time thereby providing a charge on the capacitor 66. As the charge on the capacitor 66 is built up, it is provided on the resistor 70 and 71 along with the resistor 72 and the capacitor 73 to the base 74 of transistor Q4. The transistor Q4 is normally nonconductive until the voltage across the capacitor 66 reaches a sufficient level to bias the emitter-base of the transistor Q4 so that the transistor Q4 can conduct. The conduction of the transistor Q4 is through a resistor 75 and a resistor 76 so that a drive voltage is provided on a base 77 of transistor Q5. When the voltage appearing across resistor 76 is sufficient to drive the transistor Q5 into conduction, the relay 34 is energized. A feedback resistor 78 is provided from the collector of the transistor Q5 to the base circuit of transistor Q4 and is a conventional regenerative type of arrangement so that the transistors Q4 and Q5 act as a switch. The operation of these transistors, when they switch, energizes the relay 34.

The detector and integrator means 32 further has a diode 80 connected between the base 64 of transistor Q3 and ground. This diode prevents a build up of voltage on the capacitor 63 of a sufficient magnitude to break down the emitter-base voltage structure of the transistor Q3. A meter jack 81 along with a resistor 82 are provided across the capacitor 66 and this can be used with a conventional high impedance meter to check for the existence of a proper operating signal.

OPERATION OF FIG. 2

The operation of FIG. 2 has been somewhat described in connection with its initial description, and follows the general operation of FIG. 1. Some detailed description of the input circuit operation will now be provided. If an intial condition is established where the lead sulphide cell 13 is exposed to no infrared radiation, its resistance will be sufficiently high and constant so that there is no alternating current output on conductor 25 to activate the switch means 26 through the medium of the band-pass amplifier 31.

If a flame is present at the lead sulphide cell or flame responsive means 13, its resistance will drop to a relatively low value and will fluctuate in value along with the flame flicker of the flame being sensed. The direct current potential across the flame responsive means or lead sulphide cell 13 is to be stabilized so that the variation of one cell to another and the background radiation does not affect the operation of the system. If it is assumed that terminal F is at, say 9 volts, and the conductor 10 is at 18 volts, a stable condition exists. This stable condition is created by selecting resistors 14 and 15 to be equal so that the potential at junction 16 is also 9 volts since the supply voltage is 18 volts. With this arrangement the input to amplifier means 20 at terminals 21 and 22 are the same.

If the potential at terminal F begins to rise, the input terminal 22 begins to rise. The amplifier means 20 immediately senses the difference between the terminals 21 and 22 and causes the output at terminal 23 to begin to rise. This causes a rise on conductor 25 and on the feedback conductor 24. The rise in voltage on the conductor 24 begins to bias the transistor Q2 toward "off" slightly. As the conduction of transistor Q2 decreases, a corresponding drop in the potential at terminal F occurs. This is the desired function of the system. With this arrangement the operation of transistor Q2 tends to maintain the voltage across terminals F and G constant, at least as far as the direct current potential is concerned. The capacitor 38 bypasses any alternating current feedback so that the feedback circuit just described basically is a direct current feedback.

It will be noted that as the conduction of transistor Q2 decreases, the current being drawn through the resistors 40 and 41, which act as a bias network for transistor Q1, also decreases. This in turn decreases the voltage drop across the resistor 40 which in turn tends to reduce the current flow through the transistor Q1. In effect, the use of the resistors 40 and 41 in a series circuit with the emitter-collector of transistor Q2, slaves the transistor Q1 to the transistor Q2. The capacitor 42 is again used to bypass any alternating current so that the effect of the variable impedance means 12 is to act as a direct current voltage regulating means across the flame responsive means 13, but for the alternating current that appears the arrangement acts as a current source to provide a low frequency alternating current signal. In effect, the transistors Q1 and Q2 with their direct current feedback look like a variable resistance to the alternating current and provide for changes in the ambient background and cell resistance of the flame responsive means 13.

The slow changes in impedance caused by changes in the background are substantially a direct current type of change as compared to the flame flicker frequency that appears on conductor 25 which in turn is fed into the switch means 26 which utilizes the clipper 30 and the band-pass amplifier 31 to provide an alternating current signal at capacitor 63. As the flame flicker continues, the alternating current created by the flame flicker passes through the capacitor 63 and is detected and integrated by the arrangement of the transistor Q3 and capacitor 66. As the capacitor 66 is "pumped up" the voltage appearing across it causes the switch means made up of transistors Q4 and Q5 to regeneratively switch "on" to in turn energize the relay 34.

Figure 3:
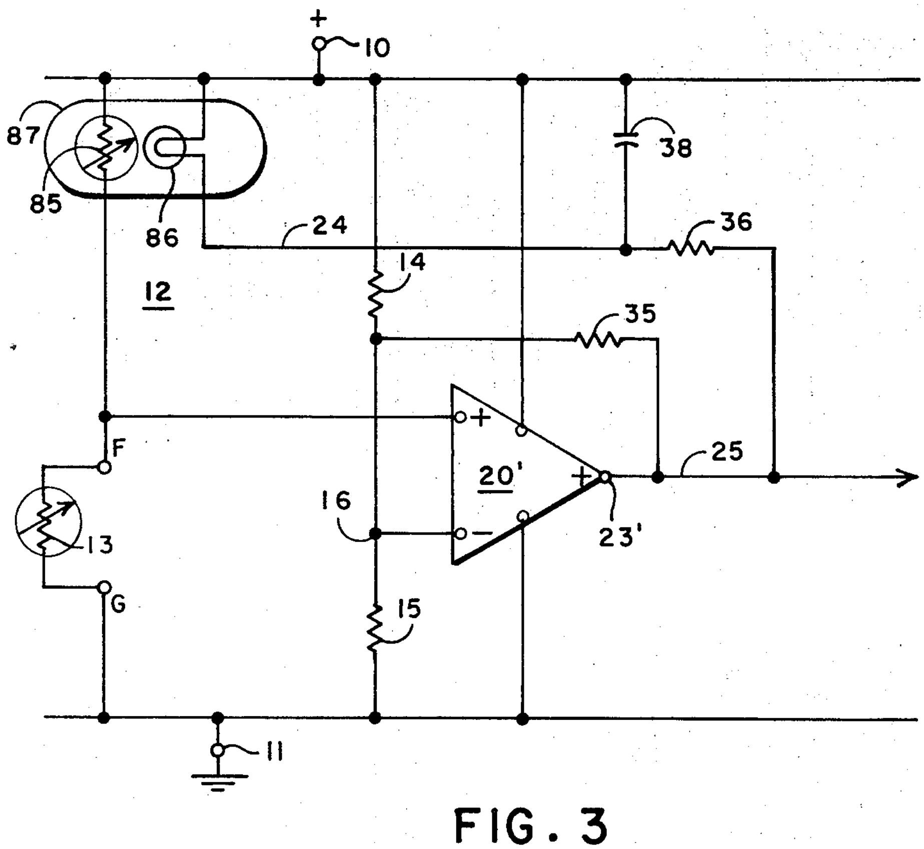
FIG. 3 is a schematic representation of a modification of the variable impedance means used in series with the flame sensor of the present invention.

In FIG. 3 there is disclosed a very simplified version of just the input circuit of the present invention using an alternate form of variable impedance means 12 and feedback 24. Again the positive terminal 10 is provided along with the ground terminal 11. The flame responsive means 13 is connected between terminals F and G but in this case the terminal F is connected by a light responsive or cadmium sulphide cell 85 to the direct current terminal 10. The cadmium sulphide cell 85 is exposed to an incandescent light 86 which will change the resistance of the cell 85 as the light output from the incandescent light 86 changes. The cell 85 and the light 86 are contained in a light tight package 87. The voltage divider made up of resistors 14 and 15 is again provided with the junction 16, which provides an input along with terminal F for an amplifier means 20'. The amplifier means 20' has a feedback resistor 35 and an output 23' along with conductor 25. A feedback resistor 36 and the capacitor 38 are again shown to the direct current feedback conductor 24.

The operation of FIG. 3 is substantially similar to that of FIG. 2. As the output across the flame responsive means or lead sulphide cell 13 changes, the voltage at terminal F changes with respect to junction 16. The amplifier 20' provides a direct current feedback on the conductor 24 which in turn changes the amount of current to the incandescent light 86. As the light 86 changes in intensity, the value of the impedance 85 changes impedance in order to stabilize the voltage at terminal F as far as the direct current is concerned. Once again the capacitor 38 is used to insure that the feedback on conductor 24 is a direct current type of feedback and is substantially free of the alternating current influence.

It is quite obvious from the fact that a very simple input circuit of FIG. 3 can be used to replace the more complex circuit of FIG. 2, that a number of possible variations in the variable impedance means 12 is possible. Since the present invention can be carried out by the use of a number of variable impedance means controlled by the direct current feedback of an amplifier along with the associated switch means 26, the applicant wishes to be limited in the scope of his invention solely by the appended claims.

The embodiments of the invention in which an exclusive property or right is claimed are defined as follows:

1. A flame detection system with direct current source means adapted to be connected to flame responsive impedance means which changes impedance when exposed to radiation from a flame, including: variable impedance means adapted to connect said flame responsive impedance means to said direct current source means; voltage reference means; amplifier means having input means and output means including feedback means with said input means connected between said flame responsive impedance means and said voltage reference means; said feedback means connected to control said variable impedance means by providing said variable impedance means with a direct current feedback voltage to stabilize a direct current potential across said flame responsive impedance means; and said output means further being connected to switch means to control said switch means in response to radiation of a flame at said flame responsive impedance means.

2. A flame detection system as described in claim 1 wherein said variable impedance means, said flame responsive impedance means, and said voltage reference means form a bridge with said amplifier means input connected to an output of said bridge.

3. A flame detection system as described in claim 2 wherein said flame responsive impedance means is an infrared flame detector.

4. A flame detection system as described in claim 3 wherein said variable impedance means includes transistor means in series circuit with said flame detector;

said transistor means being connected to said feedback means and controlled thereby.

5. A flame detection system as described in claim 4 wherein said switch means includes second amplifier means.

6. A flame detection system as described in claim 5 wherein said second amplifier means is a band-pass amplifier means responsive to pass a frequency in the frequency range of the flicker of a flame.

7. A flame detection system as described in claim 6 wherein said second amplifier means further includes clipper means to limit the voltage input to said second amplifier means.

8. A flame detection system as described in claim 7 wherein said second amplifier means also includes output means having detector and integrator circuit means responsive to said flame flicker frequency so that said detector and integrator circuit means is activated by a sequence of flame flicker signals received by said flame detector.

9. A flame detection system as described in claim 4 wherein said transistor means includes a first transistor controlled by said feedback means; and a second transistor in series circuit with said first transistor and slaved thereto.

10. A flame detection system as described in claim 1 wherein said variable impedance means is radiation responsive impedance means and radiation source means with said radiation responsive impedance means varying in impedance with changes in radiation from said radiation source means; and said feedback means connected to control a radiation level generated by said radiation source means.

11. A flame detection system as described in claim 10 wherein said radiation responsive means is a photoresistor and said radiation source means is a light source with said resistor and light source in a package.

12. A flame detection system as described in claim 10 wherein said switch means includes second amplifier means.

13. A flame detection system as described in claim 12 wherein said second amplifier means is a band-pass amplifier means responsive to pass a frequency in the frequency range of the flicker of a flame.

14. A flame detection system as described in claim 13 wherein said second amplifier means further includes clipper means to limit the voltage input to said second amplifier means.

15. A flame detection system as described in claim 14 wherein said second amplifier means also includes output means having detector and integrator circuit means responsive to said flame flicker frequency so that said detector and integrator circuit means is activated by a sequence of flame flicker signals received by said flame detector.

* * * * *